Patented June 30, 1931

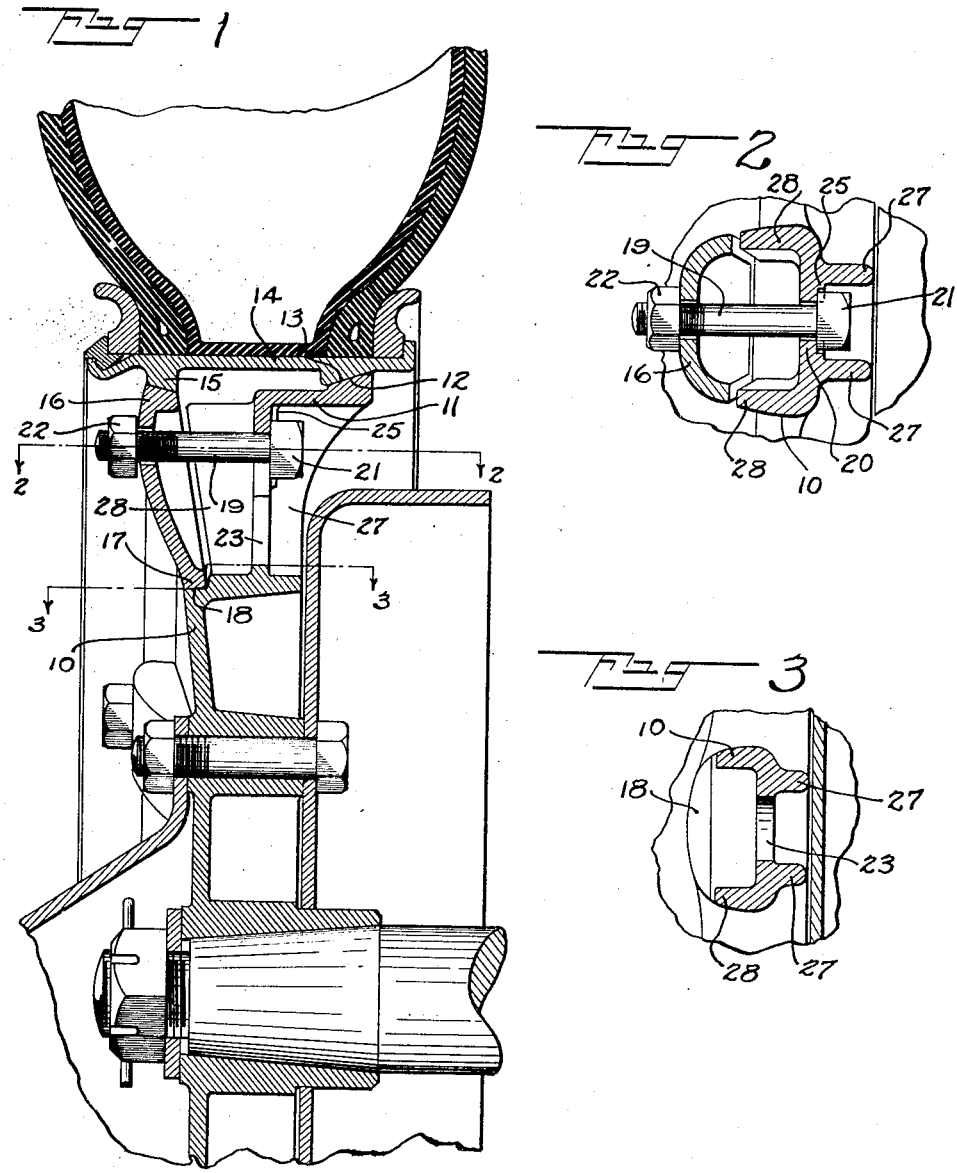

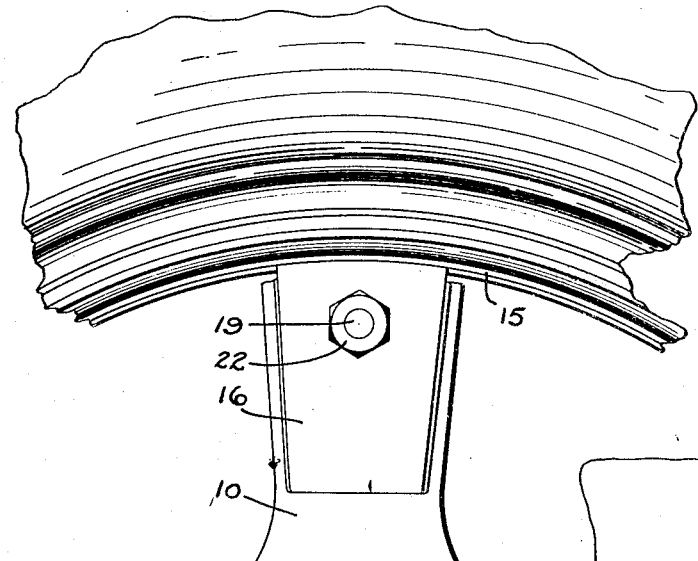
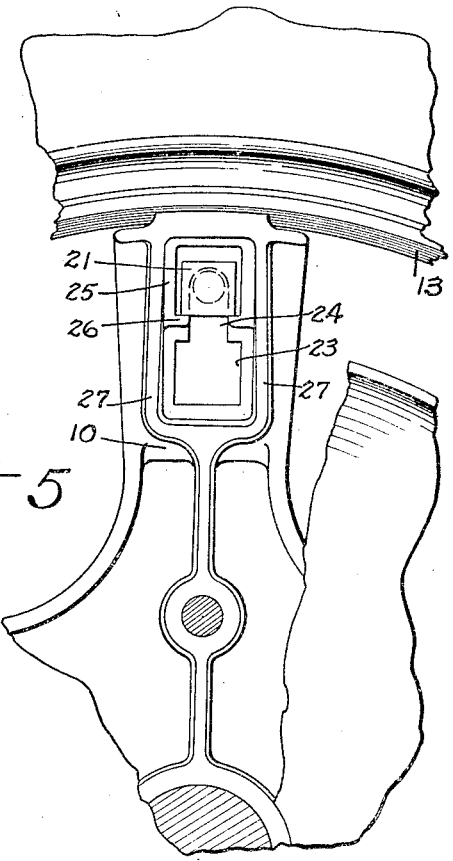
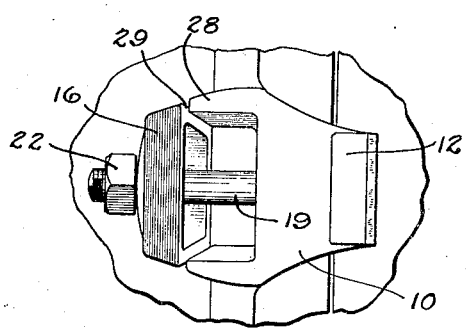

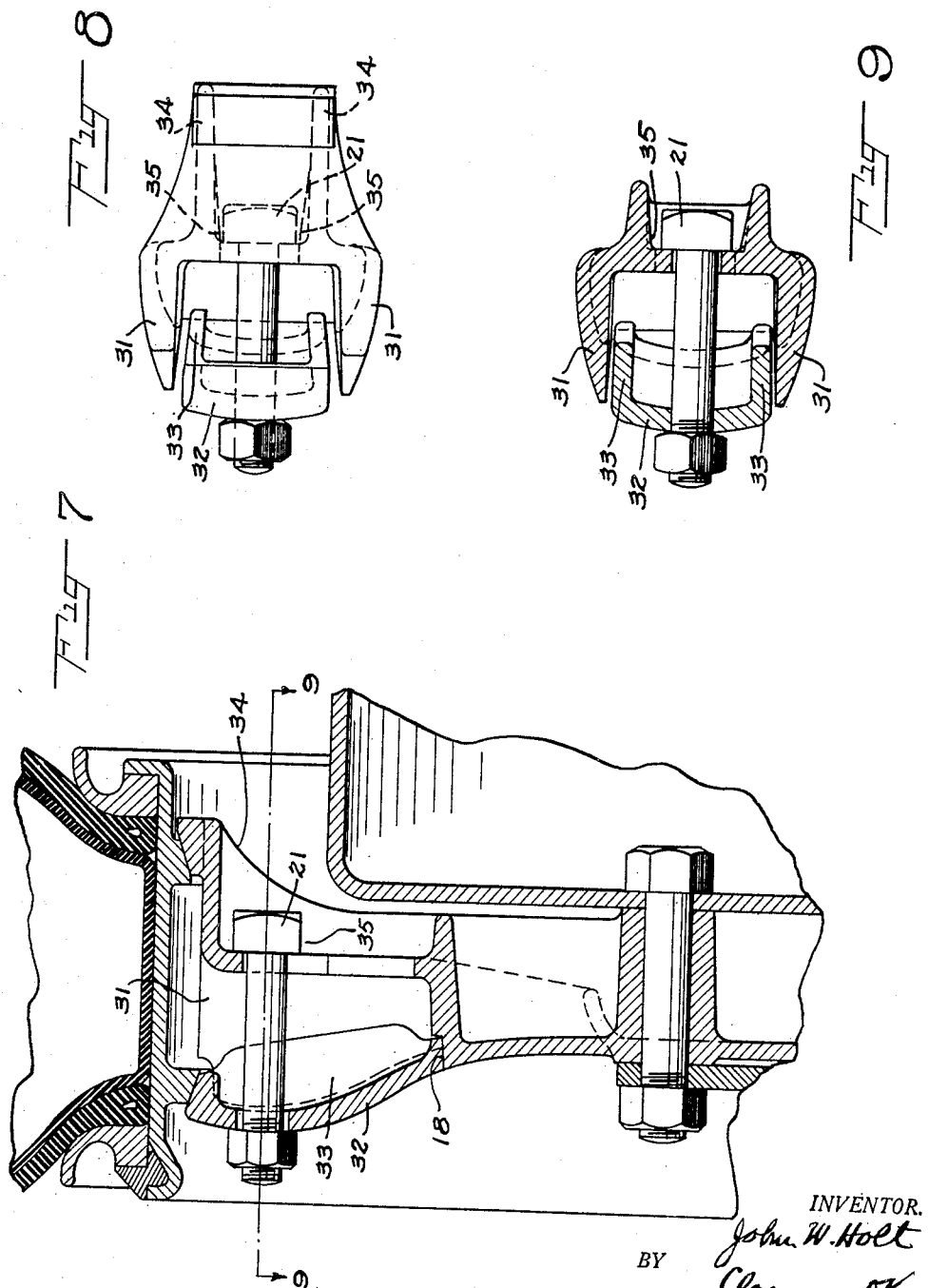

1,812,338

UNITED STATES PATENT OFFICE

JOHN W. HOLT, OF CLEVELAND, OHIO

WHEEL RIM MOUNTING DEVICE

Application filed September 1, 1926. Serial No. 132,935.

Fig. 1 is a view in transverse vertical section of a portion of a wheel structure embodying the invention; Fig. 2 is a horizontal section taken on the line 2—2 of Fig. 1; Fig. 3 is a horizontal section taken on the line 3—3 of Fig. 1; Fig. 4 is a view in front elevation of the parts shown in Fig. 1; Fig. 5 is a view in rear elevation of the parts shown in Fig. 1; Fig. 6 is a top plan view of the parts shown in Fig. 1 with the tire and rim removed; Fig. 7 is a view in transverse vertical section similar to Fig. 1 and showing a modified form of the invention; Fig. 8 is a plan view of the parts shown in Fig. 7 with the tire and rim removed; and Fig. 9 is a view in horizontal section taken on the line 9—9 of Fig. 7.

My invention relates to the construction of rim mounting mechanism for automotive vehicle wheels. In prior types of rim mounting structure used in connection with wheels in which the rim is mounted directly on the ends of the spokes, the rim clip bolts are loosely hung in the spoke end structure and remain in place therein during the interchange of rims. This arrangement of the bolts is objectionable in that the bolts in the lower portion of the wheel tilt downwardly and interfere with the placing of the rim in position on its seat. My invention has for an object the provision of a rim supporting structure including a rim clip member and an associated bolt which are capable of bodily removal as a unit from the wheel framework so to prevent obstruction of the work of changing rims.

With this and other objects in view, the invention comprises a removable rim clip member arranged to act as a wedge or strut with its lower end resting against a shoulder formed for the purpose on the spoke structure while the upper end is provided with an inclined face adapted to cooperate with an inclined surface on the rim member. A bolt passing through the spoke structure and the clip member is adapted to draw the clip into wedging or tightening position between the shoulder on the spoke structure and the engaged surface of the rim member. The spoke structure, through which the bolt is passed, is provided with an enlarged opening through which the head of the bolt may be passed to thereby provide for the removal of the clip member and the bolt as a whole during the rim changing operation. Other features of the invention will be hereinafter described and claimed.

Referring to the drawings for a more detailed description of the invention, in Fig. 1 the upper part of a wheel equipped with a rim mounting device embodying the invention is shown in section. The construction shown includes a wheel spoke member 10 terminating at its outer end in a bracket 11 having a rim receiving seat 12 which is inclined to provide a wedging action with respect to an annular bead or seat 13 formed on the rim member 14. The rim 14 is provided in its outer edge with a bead 15 having an inclined surface adapted to be engaged by a correspondingly inclined surface on a rim clip member 16 resting at its lower extremity 17 on a shoulder 18 formed in the structure of the wheel spoke 10.

In order to mount the tire supporting rim 14 on the seat 12 which is formed directly upon the terminal portion of the spoke member 10, a rim clip bolt 19 is provided which passes through the web portion 20 of the spoke framework and through the body of the clip member 16. The head 21 of the bolt bears against the rearward face of the web 20 while the nut 22 on the forward end engages the face of the rim clip member 16. With this construction it will be seen that tightening the nut 22 has the effect of swinging the clip member 16 inwardly to produce a clamping or wedging action against the rib or bead 15 formed on the rim 14. This clamping action forces the rearward bead 13 on the rim 14 into close engagement with the seat 12 on the outer end of the spoke member, thereby providing the desired tightness or snugness of fit.

An important feature of the invention resides in the mounting of the rim clip bolt 19 in the spoke structure in such a manner that the bolt can be readily removed from the spoke along with the rim clip member 16 with which it is associated. This useful feature is achieved by the provision of an opening 23 shown in Figs. 1 and 3 in the web structure 20 through which the head 21 of the bolt can be passed. The removal opening 23 is located beneath the position of the bolt 19 when in operative position and a slot 24 leading upwardly from the opening 23 provides a way by which the bolt can be lowered into a position wherein the head 21 thereon will register with the opening 23, as is shown in Figs. 1 and 3.

The rearward face of the web member 20 is provided with vertical ribs 25 and may also be provided with horizontal ribs 26 which are arranged to engage the corresponding edges of the bolt head 21 to prevent the same from turning under normal conditions of operation. With this structural arrangement, it will be seen that the bolt 19 is prevented from turning when in operative position and also the loosening of the nut 22 provides for the ready removal of both the clip member and the attached bolt from the spoke structure preparatory to the removal of the rim and the replacement of another rim in position on the seats provided at the ends of the spoke members.

The web member 20, which forms an upper portion of the spoke structure, is provided with laterally separated rearwardly extending reinforcing flanges 27 which serve to stiffen the spoke structure and to provide supporting strut members for the bracket portion 11 which bears the seat 12 for the rim. The lateral edges of the web member 20 are also provided with forwardly extending flange members 28 which serve not only to further stiffen the spoke structure but also serve as gage or guide members separated from the bead 15 on the rim by a space which indicates by its width the position of the rim relative to the wheel structure and thereby facilitates the fitting of the rim in proper alinement with the wheel. In addition, the flange members 28 serve to enclose the space between the rim clip member 16 and the web portion 11 of the spoke and thereby enhance the design and appearance of the spoke structure as a whole.

With the construction described and with the clip members 16 and the associated bolts 19 removed from their positions on the spoke members, the rim 14 is placed in position with the bead 13 thereof slightly engaging the seat 12 on the extreme end of the spoke member. The head of the bolt 19 is then passed through the opening 23 upwardly into the seat provided by the ribs 25 and 26. The lower end 17 of the clip member is then placed in position on the shoulder 18, whereupon the tightening of the nut 22 forces the clip member 16 inwardly into wedging position between the bead 15 on the rim 14 and the shoulder 18 on the spoke structure. This wedging action is a powerful one and it serves to force the rim bead 13 into the desired tightness of engagement with the seat 12 while at the same time the desired pressure or tightness of fit is exerted between the upper end of the clip member 16 and the forward bead 15 on the rim member 14.

It will be seen that the provision for the removal of the clip members 16 and their associated bolts entirely from the spoke structure leaves the end of the spokes wholly free for the reception of the rim member and correspondingly facilitates the mounting of a rim in position on the spoke seats. As the result of the ease with which the rim member can be placed in position with the structure shown, it is possible with the construction described for one man to change tires even in connection with heavy truck wheels and to place a rim in position on the spokes, whereas it is only with considerable difficulty that one man can perform the same work with constructions heretofore known and used.

Referring to Figures 7, 8 and 9 of the drawings, there is shown a modified form of the invention in which the visual indication showing the relation of the rim to the wheel is made still more obvious. In this form of the invention the spoke is provided at its outer end with flanges 31 of considerably greater depth than the flanges 28 of Fig. 1, the forward edges of the flanges 31 being substantially in alinement with the outer faces of the bead members 15 on the rim and thereby providing a visual indication of the position of the rim with relation to the wheel.

The rim clip member 32 in the modified form of the invention is also provided with relatively deep forwardly or outwardly extending flange member 33 arranged to occupy positions between the inwardly extending flanges 31 of the spoke structure. The spoke flanges 31 accordingly serve as guide members for the rim clip member and prevent lateral rocking of the clip member and providing a full bearing of the member on its seat 18. Not only is complete alinement of the clip member with the spoke structure assured by the structural relation of parts described but the inward depth of the spoke flanges 31 produces a corresponding increase in strength of the spoke structure. In addition, the overlapping arrangement of the spoke flanges with relation to the rim clip member produces a desirable enclosed structure.

Referring to Fig. 8 of the drawings, it will be seen that the inner surfaces of the rearwardly extending spoke flanges 34 converge as at 35 to form stop members for preventing rotation of the bolt bead 21.

While the wedging clip member 16 has been referred to in its capacity of functioning as a wedge or strut member to support the adjacent portion of the tire supporting rim, the clip member may also function as a spring tensioning member wherein the inherent resiliency of the member is utilized to increase the gripping or wedging action of the clip member against the inclined surface 15 of the rim. In addition, the resilient action referred to is usually applied in assisting in the removal of the clip member when the nut 22 is loosened with respect thereto. The springing of the clip member 16 to its normal position when the nut is loosened acts to free the end portions thereof from their points of engagement with the abutting parts and thereby brings about the automatic release of the wedging clip member from its position without requiring prying or hammering operations.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:—

In a vehicle wheel, a removable rim having outer and inner oppositely tapered supporting flanges, spoke members terminating in tapered seats for engaging the inner supporting flange, shoulders on the outer faces of said spoke members, clip members adapted to be forced between the shoulders and the rim, bolts passing through the clip members and the spoke structure and laterally disposed flange members extending outwardly from the spoke members and substantially in line with the face of the outer supporting flange to provide clearance indicating means to facilitate accurate placing of said rim, said flange members being so positioned as to serve also as guides for the clip members.

JOHN W. HOLT.